United States Patent
Ando et al.

(10) Patent No.: US 8,923,103 B2
(45) Date of Patent: Dec. 30, 2014

(54) OPTICAL-INFORMATION RECORDING MEDIUM AND PLAYBACK APPARATUS

(71) Applicant: Sony Corporation, Tokyo (JP)

(72) Inventors: Hideki Ando, Tokyo (JP); Toshihiro Horigome, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/912,274

(22) Filed: Jun. 7, 2013

(65) Prior Publication Data
US 2013/0336097 A1    Dec. 19, 2013

(30) Foreign Application Priority Data
Jun. 15, 2012    (JP) .................... 2012-136202

(51) Int. Cl.
| | |
|---|---|
| G11B 7/00 | (2006.01) |
| G11B 7/24 | (2013.01) |
| G11B 27/28 | (2006.01) |
| G11B 7/24082 | (2013.01) |
| G11B 7/007 | (2006.01) |

(52) U.S. Cl.
CPC .... *G11B 7/00718* (2013.01); *G11B 2220/2541* (2013.01); *G11B 2007/00754* (2013.01); *G11B 27/28* (2013.01); *G11B 7/24082* (2013.01)
USPC ............. 369/30.03; 369/275.4; 369/277; 369/44.13

(58) Field of Classification Search
None
See application file for complete search history.

(56) References Cited

U.S. PATENT DOCUMENTS

2002/0012295 A1 *   1/2002   Asano et al. ............. 369/44.26

FOREIGN PATENT DOCUMENTS

| JP | 09-219024 A | 8/1997 |
|---|---|---|
| JP | 2003-178464 A | 6/2003 |
| JP | 2006-228293 A | 8/2006 |

* cited by examiner

*Primary Examiner* — Muhammad N Edun
(74) *Attorney, Agent, or Firm* — Wolf, Greenfield & Sacks, P.C.

(57) ABSTRACT

An optical-information recording medium includes a groove and a land that are alternately provided. Address information in the groove is recorded by wobbles in the groove, and address information on the land is recorded by a combination of the wobbles in the grooves provided at two opposite sides of the land.

8 Claims, 20 Drawing Sheets

FIG. 4

| ADIP UNIT NO. | ADIP UNIT TYPE | ADIP NIBBLE BIT NO. | ADIP CODE WORD NIBBLE NO. |
|---|---|---|---|
| 0 | MONOTONE | - - - | - - - |
| 1 | sync_0 | - - - | |
| 2 | MONOTONE | - - - | |
| 3 | sync_1 | - - - | |
| 4 | MONOTONE | - - - | |
| 5 | sync_2 | - - - | |
| 6 | MONOTONE | - - - | |
| 7 | sync_3 | - - - | |
| 8 | REFERENCE | - - - | |
| 9 | data_x | b3 | C0 |
| 10 | data_x | b2 | |
| 11 | data_x | b1 | |
| 12 | data_x | b0 | |
| 13 | REFERENCE | | - - - |
| 14 | data_x | b3 | C1 |
| 15 | data_x | b2 | |
| 16 | data_x | b1 | |
| 17 | data_x | b0 | |
| 18 | REFERENCE | | |
| 78 | REFERENCE | | - - - |
| 79 | data_x | b3 | C14 |
| 80 | data_x | b2 | |
| 81 | data_x | b1 | |
| 82 | data_x | b0 | | c(n)=1

GROOVE: STW SIGNAL S1 "−1"
↓
GROOVE: ADDRESS INFORMATION "0"

GROOVE: STW SIGNAL S2 "+1"
↓
GROOVE: ADDRESS INFORMATION "1"

FIG. 11A
n-1 TRACK
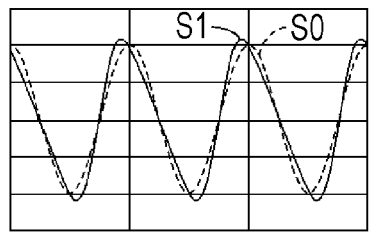
GROOVE: STW SIGNAL S1 "-1"
n+1 TRACK
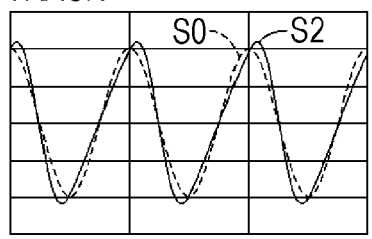
GROOVE: STW SIGNAL S2 "+1"
n TRACK
LAND: SIGNAL S12 "0"
↓
n TRACK
LAND: ADDRESS INFORMATION "1"
FIG. 11B
n-1 TRACK
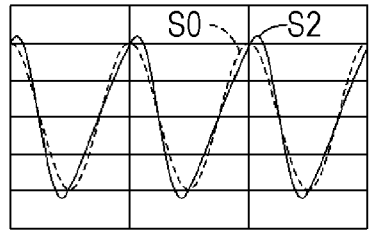
GROOVE: STW SIGNAL S2 "+1"
n+1 TRACK
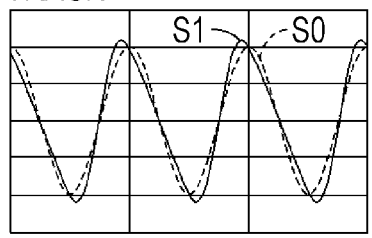
GROOVE: STW SIGNAL S1 "-1"
n TRACK
LAND: SIGNAL S21 "0"
↓
n TRACK
LAND: ADDRESS INFORMATION "1"

OPTICAL-INFORMATION RECORDING MEDIUM AND PLAYBACK APPARATUS

BACKGROUND

The present technology relates to an optical-information recording medium and a playback apparatus for playing back it. More particularly, the present technology relates to an optical-information recording medium having a groove and a land that are alternately provided.

Optical discs to which information is recorded or from which information is played back using laser light have been put to practical use. Types of optical disc include a playback-only optical disc, a write-once optical disc, and a rewritable optical disc. With write-once and rewritable optical discs, address information indicating positions thereon is pre-recorded in order to enable recording of information.

Two types of system are available as a system for recording the address information. One of the systems is a system for recording the address information as preformat pits. The other system is a system for modulating (wobbling) signals provided by a groove. A track formed by the groove is called a "groove track". The groove is a defined as a portion irradiated with laser light during manufacture of the optical disc. An area located between adjacent grooves is called a "land" and a track formed on the track is called a "land track".

In recent years, it is desired that the recording capacity of optical discs be further increased. In order to increase the recording capacity, it is desired to employ a system for recording data to both of the groove track and the land track (this system is hereinafter referred to as a "land/groove recording system", as appropriate). In the land/groove recording system, the address information on the groove track can be recorded by deflecting laser light during cutting.

In the land/groove recording system, an optical disc has been proposed which makes it possible to play back the addresses on both of the groove track and the land track. Japanese Unexamined Patent Application Publication No. 9-219024 discloses the following technology. When addresses are recorded to the groove track with a wobble, the addresses are intermittently recorded and the phases of the recording positions of the addresses are reversed between the adjacent group tracks. With such an arrangement, during playback of the wobble track, the previously recorded address information is intermittently played back, and during playback of the land track, the addresses on groove tracks at two opposite sides of and adjacent to the land track are alternately played back. Thus, wobble information (address information) can be obtained both during groove scan and during land scan.

Japanese Unexamined Patent Application Publication No. 2003-178464 and Japanese Unexamined Patent Application Publication No. 2006-228293 discloses the technologies. Each of the land track and the groove track is wobbled and wobbles are used to record address information to sidewalls of each track. In addition, address information blocks on a wobble track and address information blocks on a groove track are arranged offset in a track direction.

SUMMARY

It is desirable to provide an optical-information recording medium that can be fabricated without use of a highly difficult mastering technology and that allows address information to be efficiently recorded by suppressing a reduction in a data region for recording user data and so on and to provide a playback apparatus for playing back the optical-information recording medium.

In order to overcome the above-described problem, according to a first technology, there is provided an optical-information recording medium including a groove and a land that are alternately provided. Address information in the groove is recorded by wobbles in the groove, and address information on the land is recorded by a combination of the wobbles in the grooves provided at two opposite sides of the land.

According to a second technology, there is provided a playback apparatus including: an optical unit configured to obtain reflection light by irradiating a land or a groove of an optical-information recording medium with light; an address-signal generator configured to generate an address signal recorded by a combination of wobbles in the grooves provided at two opposite sides of the land, on the basis of the reflection light obtained by the optical unit; and an address-information obtainer configured to obtain land address information from the address signal generated by the address-signal generator.

In the present technology, groove address information and land address information are recorded by wobbles in the groove. Thus, during mastering, the groove address information and the land address information can be recorded with single-beam exposure. In addition, since the address information do not have to be recorded as preformat pits, a reduction in a data region for recording user data and so on can be suppressed.

As described above, according to the present technology, an optical-information recording medium can be fabricated without use of a highly difficult mastering technology and address information can be efficiently recorded by suppressing a reduction in a data region for recording user data and so on.

BRIEF DESCRIPTION OF THE DRAWINGS

FIG. 4 is a table illustrating the data structure of an ADIP word in the BD format;

FIG. 11A is a schematic diagram illustrating a third combination of STW signals;

FIG. 11B is a schematic diagram illustrating a fourth combination of STW signals;

DETAILED DESCRIPTION OF EMBODIMENTS

With reference to the accompanying drawings, embodiments of the present technology will be described in the following order.
1. Configuration of Optical-Information Recording Medium
2. Format of Optical-information Recording Medium
3. Address Information of Optical-Information Recording Medium
4. Configuration of Playback Apparatus
5. Operation of Playback Apparatus
6. Modifications

[1. Configuration of Optical-Information Recording Medium]

Figure 1A:
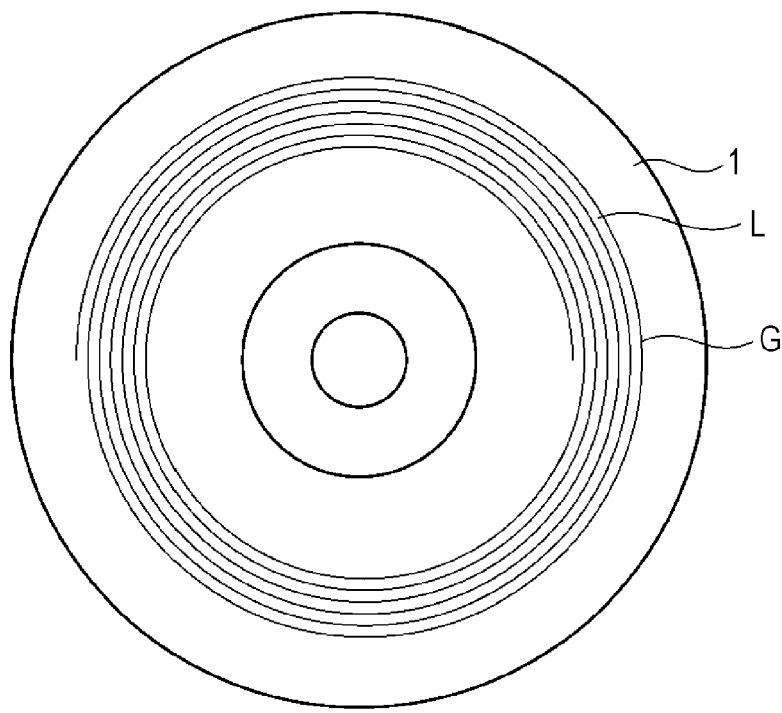
FIG. 1A is a schematic diagram illustrating one example of the structure of an optical-information recording medium according to one embodiment of the present technology.
Figure 1B:
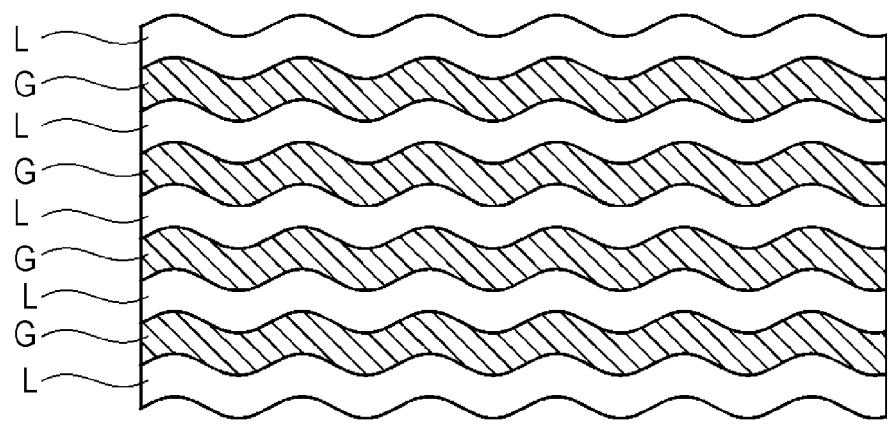
FIG. 1B is an enlarged schematic diagram illustrating a portion of the optical-information recording medium illustrated in FIG. 1A.

FIG. 1A is a schematic diagram illustrating one example of the structure of an optical-information recording medium according to one embodiment of the present technology. FIG. 1B is an enlarged schematic diagram illustrating a portion of the optical-information recording medium illustrated in FIG. 1A. An optical-information recording medium 1 is, for example, a write-once or rewritable optical disc and has a circular shape having an opening (a center hole) formed at the center thereof. The optical-information recording medium 1 has a land L and a groove G that are alternately provided on a substrate surface. The land L and the groove G have, for example, a spiral or concentric circular shape. The groove G is wobbled (meandered) in order for linear-speed stabilization, address-information addition, and so on.

[2. Format of Optical-Information Recording Medium]

The format of address information and so on of the optical-information recording medium 1 according to one embodiment of the present technology may be designed so as to comply with a Blu-ray Disc (BD, registered trademark) format. Such an arrangement allows for use of much of the technology of the BD, which is a high-density optical disc. Thus, a description below will be given of the address information of the BD format.

Figure 2:
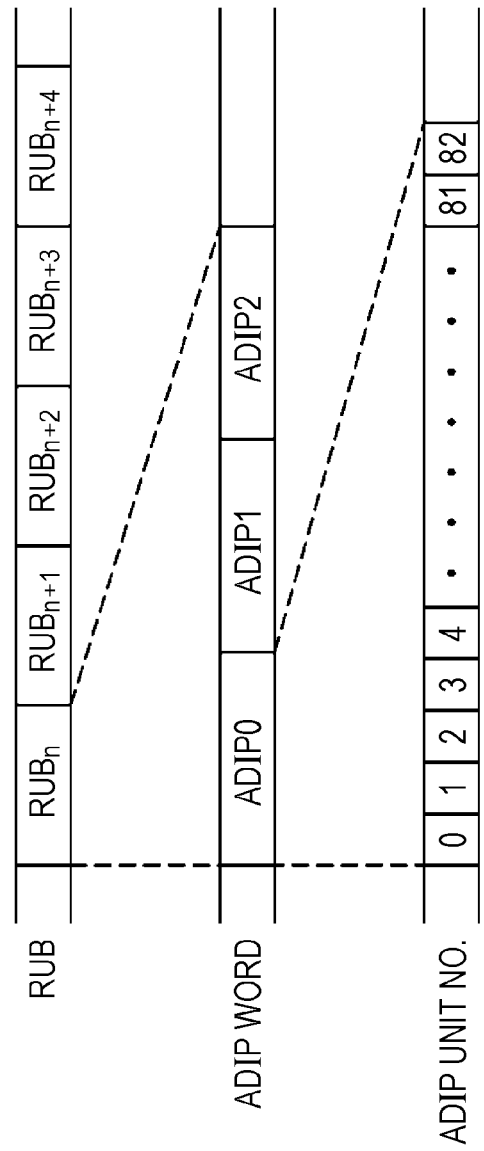
FIG. 2 is a schematic diagram illustrating address information of a BD format.

As illustrated in FIG. 2, main data written is a series of recording unit blocks (RUBs), i.e., $RUB_{n+0}$, $RUB_{n+1}$, $RUB_{n+2}$, $RUB_{n+3}$ .... Each RUB is a unit for recording main data (record/playback data) and has a predetermined length, for example, 64 kilobytes. Three address-in-pregroove (ADIP) words, that is, ADIP0, ADIP1, and ADIP2, are assigned to each RUB. The ADIP0, ADIP1, and ADIP2 have the same address information.

In addition, one ADIP word includes 83 ADIP units (unit numbers 0 to 82). One ADIP word contains 24-bit address information, 12-bit auxiliary data, a reference region, error correction code, and so on. Those pieces of information are represented using, for example, 60 ADIP units of the 83 ADIP units.

Figure 3:
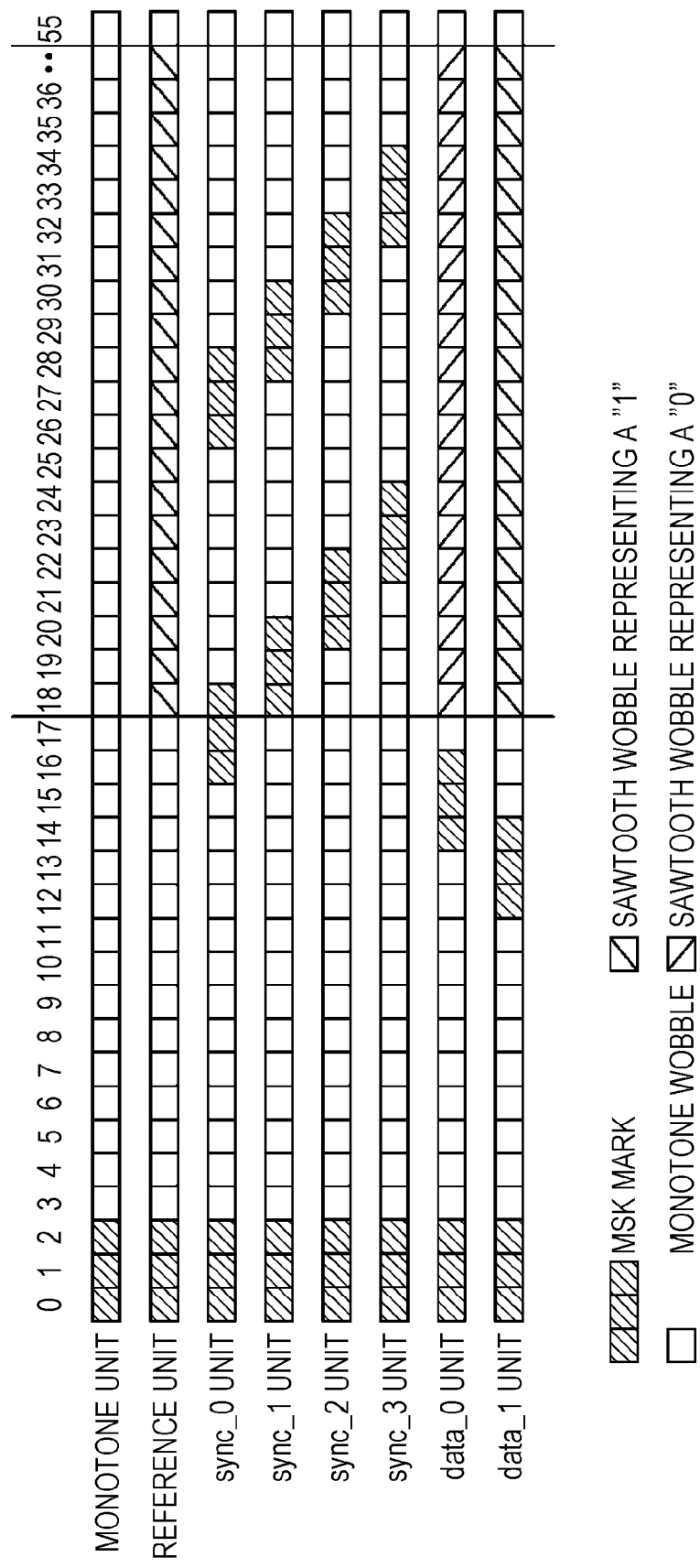
FIG. 3 is a schematic diagram illustrating ADIP units in the BD format.

As illustrated in FIG. 3, a group of a total of 56 wobbles constitutes an ADIP unit. The ADIP unit represents 1 bit of "0" or "1", synchronization information, a reference unit, or a monotone unit. One wobble corresponds to, for example, one cycle of a fundamental wobble waveform ($\cos(2\pi ft)$). Thus, one ADIP word is constituted by 83×56 wobbles. FIG. 3 illustrates eight types of ADIP unit (i.e., a monotone unit, a reference unit, four types of synchronization unit, and two types of data unit respectively indicating data "0" and data "1"). In FIG. 3, a group of 35 wobbles is illustrated because of restriction of drawing space.

As illustrated in FIG. 3, an ADIP unit of 56 wobbles is distinguished with wobble numbers 0 to 55 being added thereto. In this case, for example, sections with wobble numbers 0 to 2 and so on are modulated by MSK (Minimum Shift Keying) and sections with wobble numbers 18 to 54 of the reference unit and the data unit are modulated by STW (Saw Tooth Wobble). Unmodulated monotone wobbles are wobbled with a fundamental with a predetermined frequency "$\cos(2\pi ft)$".

The ADIP words have a data structure as illustrated in FIG. 4. The ADIP unit types in FIG. 4 correspond to the types of ADIP unit in FIG. 3. One ADIP word contains 60-bit data.

Figure 5:
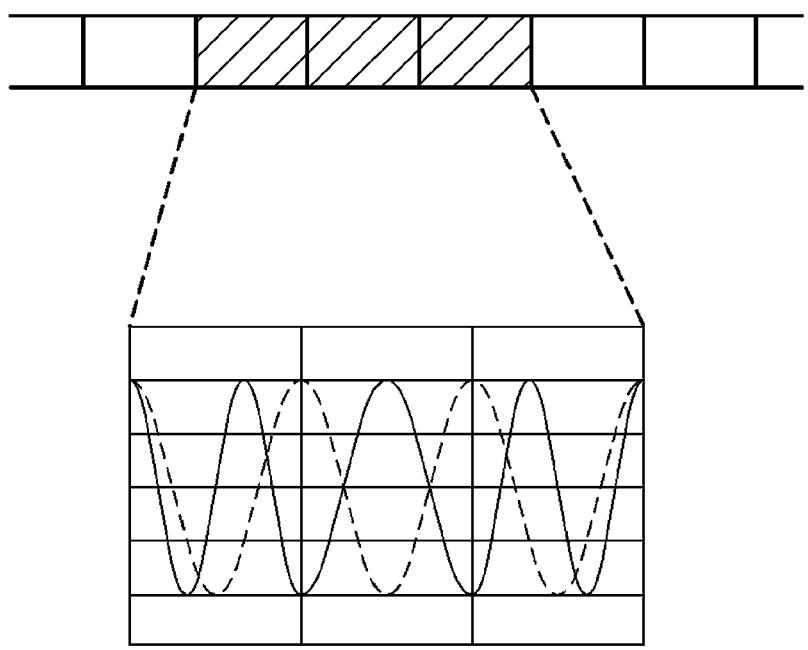
FIG. 5 is a waveform diagram illustrating MSK.

As illustrated in FIG. 5, one MSK is constituted by three wobbles. The frequencies of the first and last wobbles of the MSK are 1.5 times the fundamental, so that the polarity of the waveform of the center wobble is reversed relative to the polarity of the portions that are not the MSK. An MSK is arranged at the front end (zeroth to second wobbles) of each ADIP unit and is used to detect the front-end position of the ADIP unit.

In addition, as illustrated in FIG. 3, an MSK is arranged at the position of the 14th to 16th wobbles from the front end of the data_0 ADIP unit and an MSK is arranged at the position of the 12th to 14th wobbles from the front end of the data_1 ADIP unit. Thus, data "0" and "1" are expressed depending on the position of the MSK.

In the data_0 ADIP unit, the MSK is set to 0 and STWs indicating "0" are arranged at the sections of 18th to 55th wobbles from the front end. In the data_1 ADIP unit, the MSK is set to 1 and STWs indicating "1" are arranged at the sections of the 18th to 55th wobbles from the front end.

In the STW system, a second harmonic ($\sin(2\pi 2 ft)$) is added to or subtracted from the fundamental ($\cos(2\pi ft)$) to thereby generate a modulation waveform similar to a sawtooth form. The amplitude of the second harmonic is set to have a small value, which is about one-fourth the fundamental waveform. Since one of the addition and subtraction is selected depending on data "0" or "1", different modulation waveforms are generated. Wobble numbers of the reference unit and the data units are repeatedly recorded in the sections 18 to 54.

Two types of system is used as described above in order to make it possible to compensate for shortcomings of each system. In the MSK system, since the first three wobbles in the ADIP unit are modulated to record 1 bit, it can be used as a reference for determining the position of data during playback. On the other hand, in the STW system, data are repeatedly recorded in a wide range as minute waveform changes, and during playback, playback signals are integrated to identify "0" or "1". It is therefore difficult to use the playback signals as information for detecting a delimiter of data. However, the MSK system, which is a local recording system, is susceptible to blemishes due to scratches, dust, and so on on the disc. The STW system has an advantage in that it is less susceptible to blemishes, since the data are recorded for a long period of time.

Figure 6A:
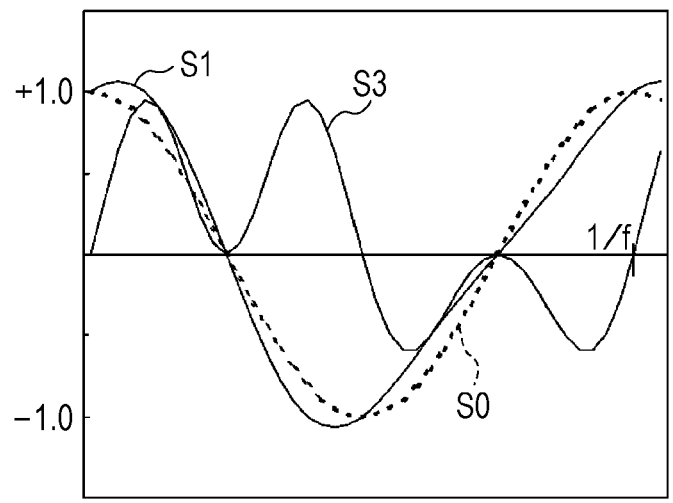
FIGS. 6A and 6B are waveform diagrams illustrating STWs.

A modulated wobble signal in the STW system will now be described in more detail with reference to FIGS. 6 and 7. In FIGS. 6 and 7, the horizontal axis represents a time axis along which one period (i.e., one wobble) of a fundamental wobble waveform is illustrated and the vertical axis represents a normalized amplitude. FIG. 6A illustrates a waveform when data c(n) is "1" and FIG. 7A illustrates a waveform when data c(n) is "0".

Figure 7A:
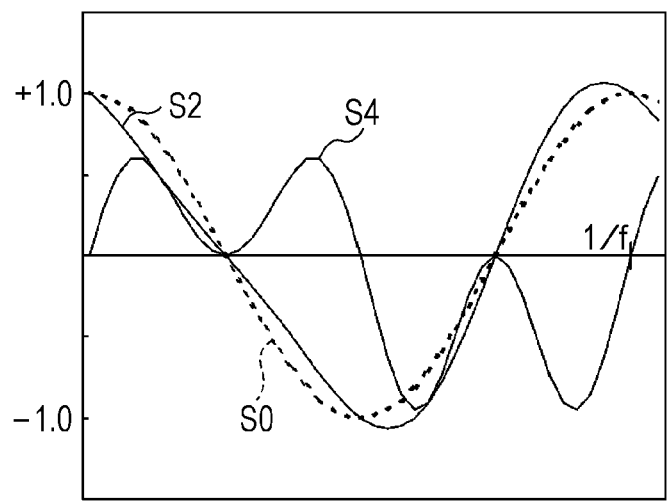
FIGS. 7A and 7B are waveform diagrams illustrating STWs.

In FIGS. 6A and 7A, the waveform denoted by the dotted line represents a fundamental wobble waveform S0 (=cos (2πft)). For c(n)="1", a sin signal having twice the frequency of the fundamental wobble waveform S0 is added to the fundamental wobble waveform S0 to form a modulated waveform S1. That is, S1=A(cos(2πft))+a(sin(2π2 ft)) is given. In this case, a relationship of A>a is given, and, for example, A=1 and a=0.2. The modulated wobble waveform S1 is a waveform modulated so that the rising edge (the disc outer direction in the disc diameter direction) thereof is gentler in the time direction than the rising edge of the fundamental wobble waveform S0 and the falling edge (the disc inner direction in the disc diameter direction) is steeper than the falling edge of the fundamental wobble waveform S0.

As illustrated in FIG. 7A, for c(n)="0", a sin signal having twice the frequency of the fundamental wobble waveform S0 is subtracted from the fundamental wobble waveform S0 to thereby form a modulated waveform S2. That is, S2=A(cos (2πft))−a(sin(2π2 ft)) is given. The modulated wobble waveform S2 is a waveform modulated so that the rising edge (the disc outer direction) thereof is steeper in the time direction than the rising edge of the fundamental wobble waveform S0 and the falling edge (the disc inner direction) is gentler than the falling edge of the fundamental wobble waveform S0. The zero-crossing points of both of the modulated wobble waveforms S1 and S2 have the same phase as the zero-crossing point of the fundamental wobble waveform, so as to enable easy extraction of a clock at a playback side.

In FIGS. 6A and 7A, waveforms S3 and S4 each represent a waveform obtained by multiplying a playback modulation wobble signal with a sin signal (sin(2π2 ft)) having twice the frequency of the fundamental used for processing at the playback side. That is, the expression "playback modulation wobble waveform S1×sin(2π2 ft)" provides the waveform S3 and the expression "playback modulation wobble waveform S2×sin(2π2 ft)" provides the waveform S4.

Figure 6B:
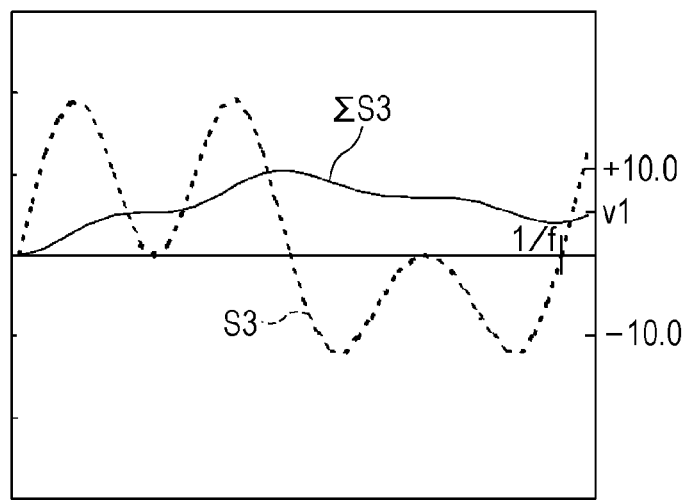
Figure 7B:
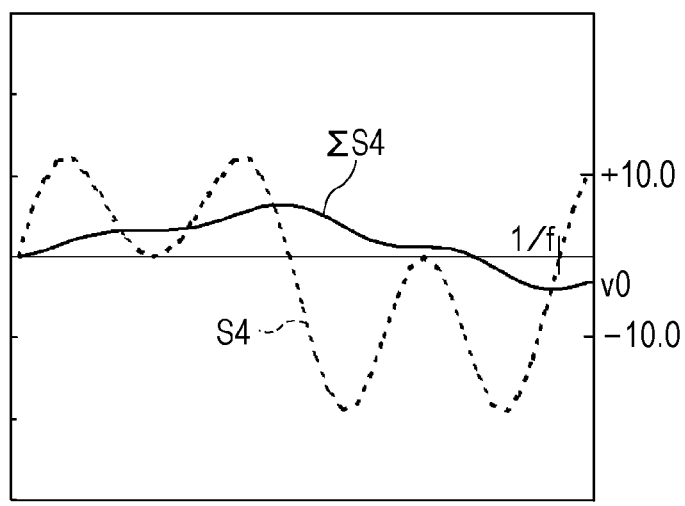

As illustrated in FIG. 6B and FIG. 7B, the waveforms S3 and S4 are integrated (added up) throughout a one-wobble period to provide integrated values ΣS3 and ΣS4, respectively. The integrated value ΣS3 when a one-wobble period passes is a positive value v1. On the other hand, the integrated value S4 when a one-wobble period passes is a negative value v0. The integrated values are handled such that, for example, v1=+1 and v0=−1.

As described above, 37 wobbles from the wobbles 18 to 54 are STW-modulated. Thus, when all of the wobbles in the STW-modulated sections indicate +1, +37 is obtained as an integration result of the 37 wobbles, and when all of the wobbles in the STW-modulated sections indicate −1, −37 is obtained as an integration result of the 37 wobbles. A playback chip sequence determined as the integration values of wobbles is multiplexed by the same code sequence as a code sequence used during recording, and on the basis of a result obtained by integrating the result of the multiplication for 37 wobbles, 1 bit ("1"/"0") of data is identified.

[3. Address Information of Optical-Information Recording Medium] (Address Format)

Figure 8:
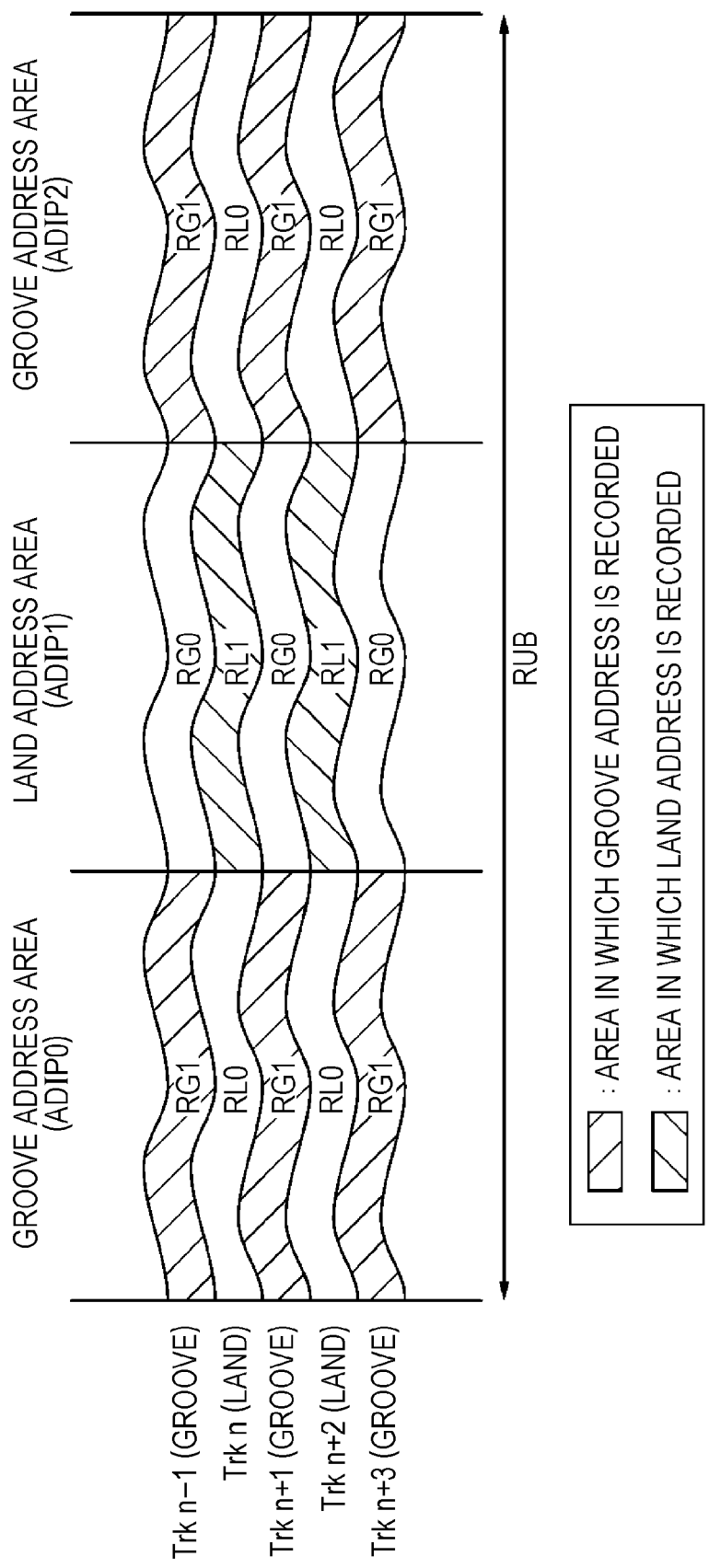
FIG. 8 is a schematic diagram illustrating an extracted portion of an address area included in one RUB.

FIG. 8 is a schematic diagram illustrating an extracted portion of an address area included in one RUB. Three ADIP words (ADIP0, ADIP1, and ADIP2) are assigned to each RUB. In the present embodiment, land addresses are constituted by only modulating wobbles in the groove so as to allow for mastering without making significant changes to a typical BD mastering apparatus.

As illustrated in FIG. 8, the address areas are classified into two types of area, i.e., a groove address area and a land address area. A groove address area and a land address area are alternately arranged, for example, in a circumferential direction of the optical-information recording medium 1. Valid groove address information is recorded in a groove portion RG1 in the groove address area, whereas invalid land address information is recorded in a land portion RL0 in the groove address area. On the other hand, valid land address information is recorded in a land portion RL1 in the land address area, whereas invalid groove address information is recorded in a groove portion RG0 in the land address area.

The groove address information is recorded with wobbles in the groove. More specifically, the groove address information is recorded as binary information by modulating the groove with two types of STW signal having different polarities. On the other hand, the land address information is recorded by a combination of the polarities of the wobbles in the grooves provided at two opposite sides of the land. More specifically, the land address information is recorded as three-value information by modulating grooves, provided at two opposite sides of and adjacent to the land, with two types of STW signal having different polarities. The STWs in the grooves that are adjacent to each other with the land interposed therebetween are set so as to have the same phase or substantially the same phase. That is, a constant angular velocity (CAV) format or a zone CAV format is employed as the format of the optical-information recording medium 1 according to the present embodiment.

The STWs are constituted by an STW having a negative polarity (a first wobble), and an STW having a positive polarity (a second wobble). The land address information is recorded as three-value information by a combination of the polarities of the STWs in the grooves provided at two opposite sides of the land.

Recording the land address information by a combination of the STWs in the grooves provided at two opposite sides of and adjacent to the land can provide the following advantages. It is possible to reduce variations in the track width of the land track. It is also possible to identify the address information on the basis of the shift direction of the vertex of the STW signal. It is therefore possible to reduce the amount of read error in the land address information.

(Address Information in Groove Address Area)

The waveform of the STW signal is a sawtooth waveform and a unit waveform constituting the STW signal has a gentle slope and a steep slope. The waveform of the STW signal has two types of waveform. The groove address information in the groove address area is recorded as binary information by the waveforms of two types of STW signal S0 and S1.

Figure 9A:
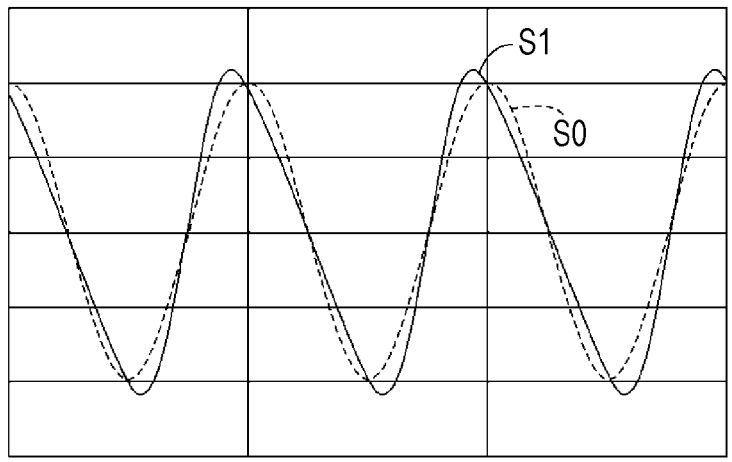
FIG. 9A is a schematic diagram illustrating the waveform of an STW signal recorded in a groove address area.

FIG. 9A is a schematic diagram illustrating the waveform of an STW signal S1 recorded in the groove address area. The waveform of the STW signal S1 is tilted relative to the waveform of the fundamental wobble signal S0 in a direction (first direction) that is opposite to a direction in which the time passes. More specifically, as illustrated in FIG. 9A, compared with the fundamental wobble signal S0, the waveform of the STW signal S1 rises steeply toward the outer circumferential side of the optical-information recording medium 1 and returns to the center side of the optical-information recording medium 1 with a gentle slope. The STW signal S1 has a negative polarity and represents data "−1" of the binary information. The playback apparatus converts the data "−1" into groove address information "0".

When the STW signal S1 is recorded in the groove address area, the playback apparatus decodes the groove address information, for example, as described below. First, the playback apparatus reads the STW signal S1 recorded in the groove address area and decodes binary information "−1" from the STW signal S1. Next, the playback apparatus converts the decoded binary information "−1" into groove address information "0".

Figure 9B:
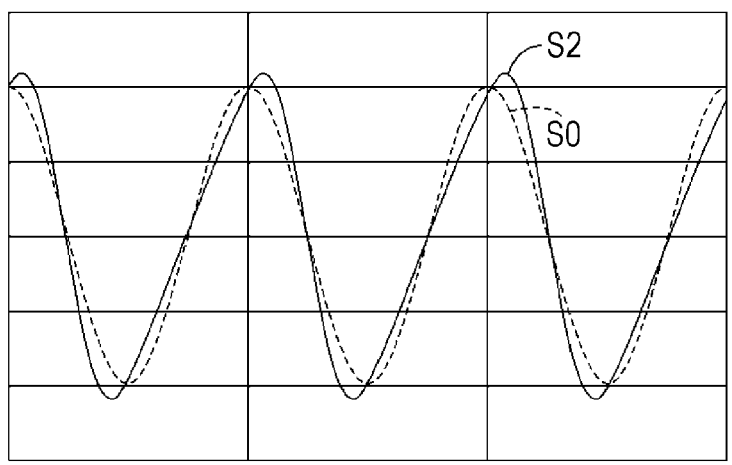
FIG. 9B is a schematic diagram illustrating the waveform of an STW signal recorded in a groove address area.

FIG. 9B is schematic diagram illustrating the waveform of an STW signal S2 recorded in a groove address area. The waveform of the STW signal S2 is tilted relative to the waveform of the fundamental wobble signal S0 in a direction (a second direction) in which the time passes. More specifically, as illustrated in FIG. 9B, compared with the fundamental wobble signal S0, the waveform of the STW signal S2 rises toward the outer circumferential side of the optical-information recording medium 1 with a gentle slope and returns steeply to the center side of the optical-information recording medium 1. The STW signal S2 has a positive polarity and indicates data "+1" of the binary information. The playback apparatus converts the data "+1" into groove address information "1".

When the STW signal S2 is recorded in the groove address area, the playback apparatus decodes the groove address information, for example, as described below. First, the playback apparatus reads the STW signal S2 recorded in the groove address area and decodes binary information "+1" from the STW signal S2. Next, the playback apparatus converts the decoded binary information "+1" into groove address information "1".

(Address Information in Land Address Area)

The address information in the land address area is recorded as three-value information by a combination (relationship) of STW signals recorded in the groove areas at two opposite sides of the land address area. The combination of STW signals has four types of combination.

Figure 10A:
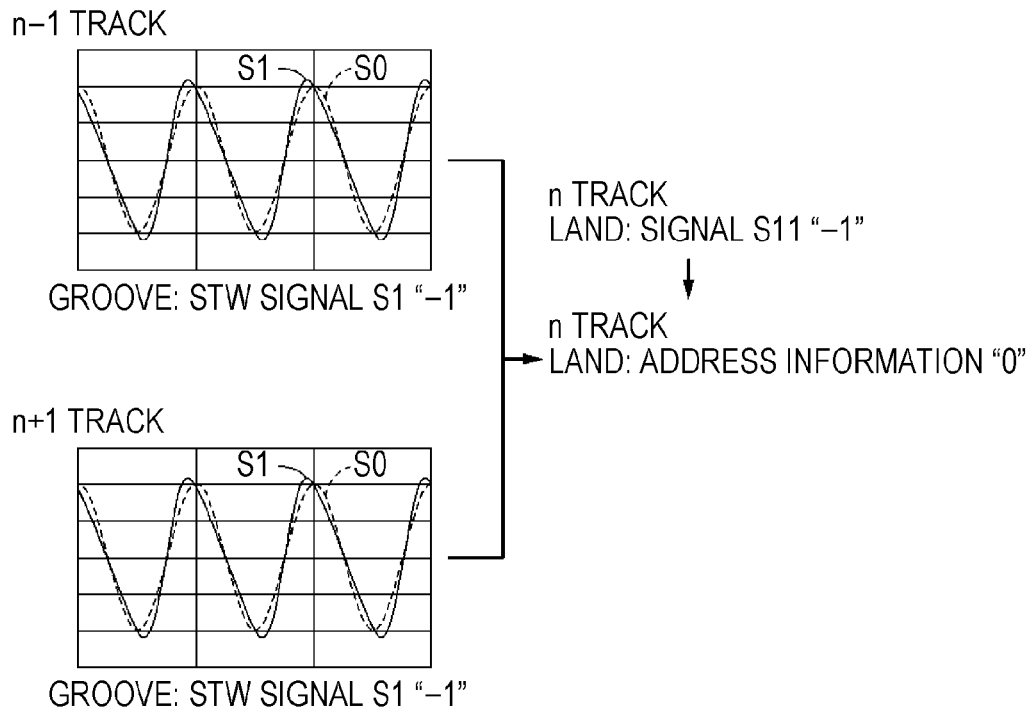
FIG. 10A is a schematic diagram illustrating a first combination of STW signals.

FIG. 10A is a schematic diagram illustrating a first combination of STW signals. An STW signal S1 having a negative polarity is recorded in the groove area at the inner circumferential side of and adjacent to a land address area. On the other hand, an STW signal S1 having a negative polarity is recorded in the groove area at the outer circumferential side of and adjacent to the land address area. In this case, a signal S11 is recorded in the land address area by a combination of the STW signal S1 in the groove area at the inner circumferential side of and adjacent to the land address area and the STW signal S1 in the groove area at the outer circumferential side of and adjacent to the land address area. The signal S11 indicates data "−1" of the three-value information. More specifically, data "−1" is recorded in the land address area by a combination of data "−1" in the groove area at the inner circumferential side of and adjacent to the land address area and data "−1" in the groove area at the outer circumferential side of and adjacent to the land address area. The playback apparatus converts the data "−1" recorded in the land address area into land address information "0". In FIG. 10A, a signal S0 represents a fundamental wobble signal.

When the signal S11 is recorded in the land address area, the playback apparatus decodes the land address information, for example, as described below. First, the playback apparatus reads the signal S11 recorded in the land address area and decodes the three-value information "−1" from the signal S11. Next, the playback apparatus converts the decoded three-value information "−1" into land address information "0".

Figure 10B:
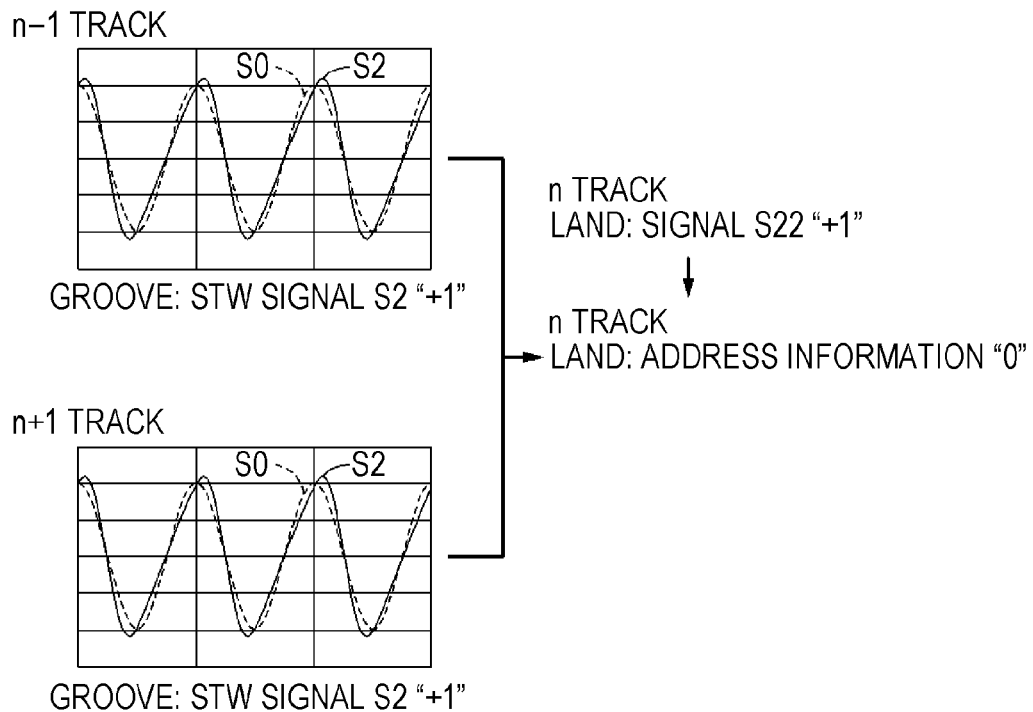
FIG. 10B is a schematic diagram illustrating a second combination of STW signals.

FIG. 10B is a schematic diagram illustrating a second combination of STW signals. An STW signal S2 having a positive polarity is recorded in the groove area at the inner circumferential side of and adjacent to a land address area. On the other hand, an STW signal S2 having a positive polarity is recorded in the groove area at the outer circumferential side of and adjacent to the land address area. In this case, a signal S22 is recorded in the land address area by a combination of the STW signal S2 in the groove area at the inner circumferential side of and adjacent to the land address area and the STW signal S2 in the groove area at the outer circumferential side of and adjacent to the land address area. The signal S22 indicates data "+1" of the three-value information. More specifically, data "+1" is recorded in the land address area by a combination of data "+1" in the groove area at the inner circumferential side of and adjacent to the land address area and data "+1" in the groove area at the outer circumferential side of and adjacent to the land address area. The playback apparatus converts the data "+1" recorded in the land address area into land address information "0". In FIG. 10B, a signal S0 represents a fundamental wobble signal.

When the signal S22 is recorded in the land address area, the playback apparatus decodes the land address information, for example, as described below. First, the playback apparatus reads the signal S22 recorded in the land address area and decodes the three-value information "+1" from the signal S22. Next, the playback apparatus converts the decoded three-value information "+1" into land address information "0".

FIG. 11A is a schematic diagram illustrating a third combination of STW signals. An STW signal S1 having a negative polarity is recorded in the groove area at the inner circumferential side of and adjacent to a land address area. On the other hand, an STW signal S2 having a positive polarity is recorded in the groove area at the outer circumferential side of and adjacent to the land address area. In this case, a signal S12 is recorded in the land address area by a combination of the STW signal S1 in the groove area at the inner circumferential side of and adjacent to the land address area and the STW signal S2 in the groove area at the outer circumferential side of and adjacent to the land address area. The signal S12 indicates data "0" of the three-value information. More specifically, data "0" is recorded in the land address area by a combination of data "−1" in the groove area at the inner circumferential side of and adjacent to the land address area and data "+1" in the groove area at the outer circumferential side of and adjacent to the land address area. The playback apparatus converts the data "0" recorded in the land address area into land address information "1". In FIG. 11A, a signal S0 represents a fundamental wobble signal.

When the signal S12 is recorded in the land address area, the playback apparatus decodes the land address information, for example, as described below. First, the playback apparatus reads the signal S12 recorded in the land address area and decodes the three-value information "0" from the signal S12. Next, the playback apparatus converts the decoded three-value information "0" into land address information "1".

FIG. 11B is a schematic diagram illustrating a fourth combination of STW signals. An STW signal S2 having a positive polarity is recorded in the groove area at the inner circumferential side of and adjacent to a land address area. On the other hand, an STW signal S1 having a negative polarity is recorded in the groove area at the outer circumferential side of and adjacent to the land address area. In this case, a signal S21 is recorded in the land address area by a combination of the STW signal S2 in the groove area at the inner circumferential side of and adjacent to the land address area and the STW signal S1 in the groove area at the outer circumferential side of and adjacent to the land address area. The signal S21 indicates data "0" of the three-value information. More specifically, data "0" is recorded in the land address area by a combination of data "+1" in the groove area at the inner circumferential side of and adjacent to the land address area and data "−1" in the groove area at the outer circumferential side of and adjacent to the land address area. The playback apparatus converts the data "0" recorded in the land address area into land address information "1". In FIG. 11B, a signal S0 represents a fundamental wobble signal.

When the signal S21 is recorded in the land address area, the playback apparatus decodes the land address information, for example, as described below. First, the playback apparatus reads the signal S21 recorded in the land address area and decodes the three-value information "0" from the signal S21. Next, the playback apparatus converts the decoded three-value information "0" into land address information "1".

(Example of Address Area)

Figure 12:
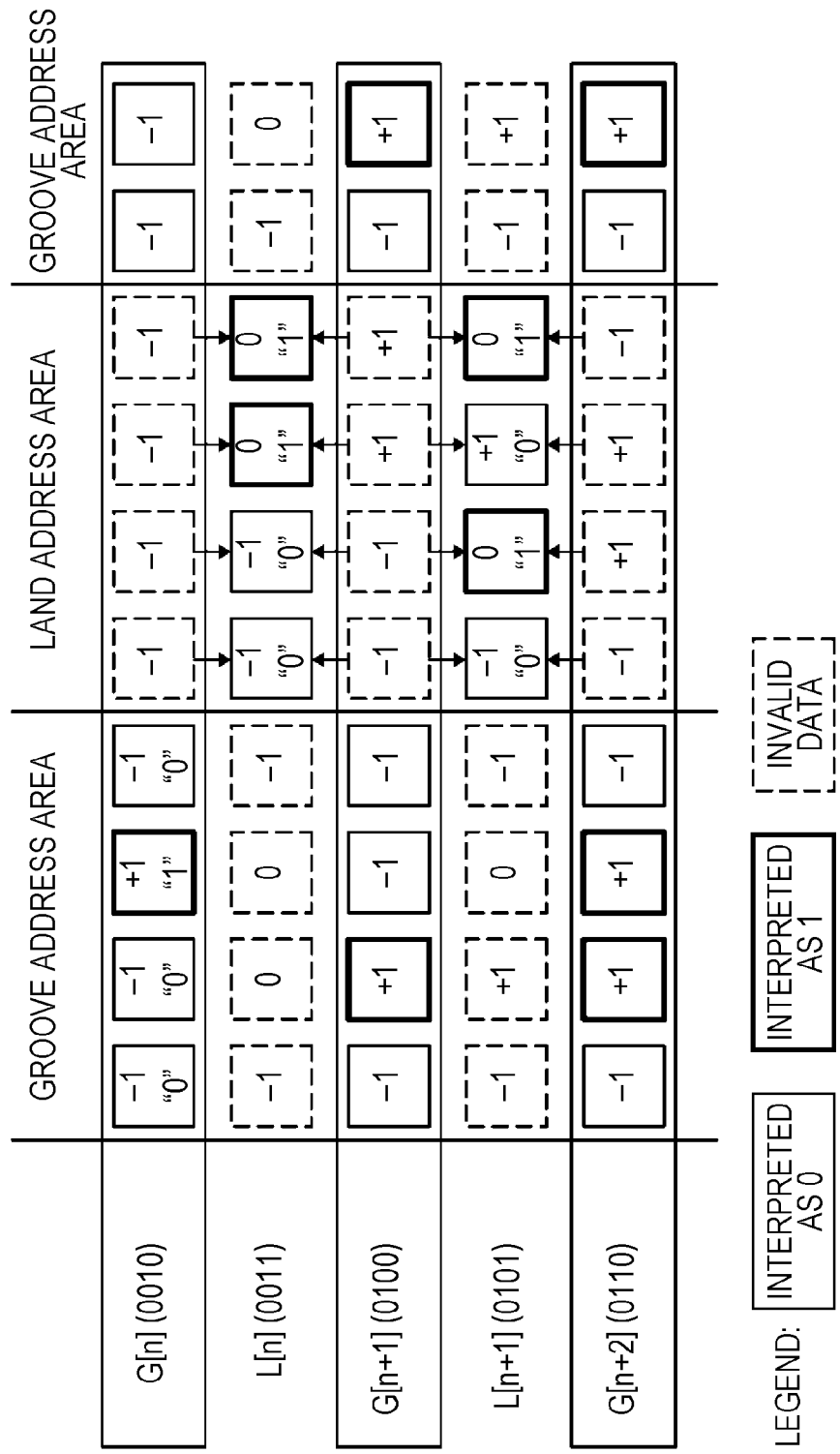
FIG. 12 is a schematic diagram illustrating one example of a groove address area and a land address area.

FIG. 12 is a schematic diagram illustrating one example of a groove address area and a land address area. The groove address information is recorded in a groove address area in a groove G[n]. On the other hand, the land address information is recorded in a land address area in a land L[n] by a combination of data in the grooves G[n] and G[n+1] at two opposite sides of and adjacent to the land L[n].

(Recording Method of Address Information)

Figure 13:
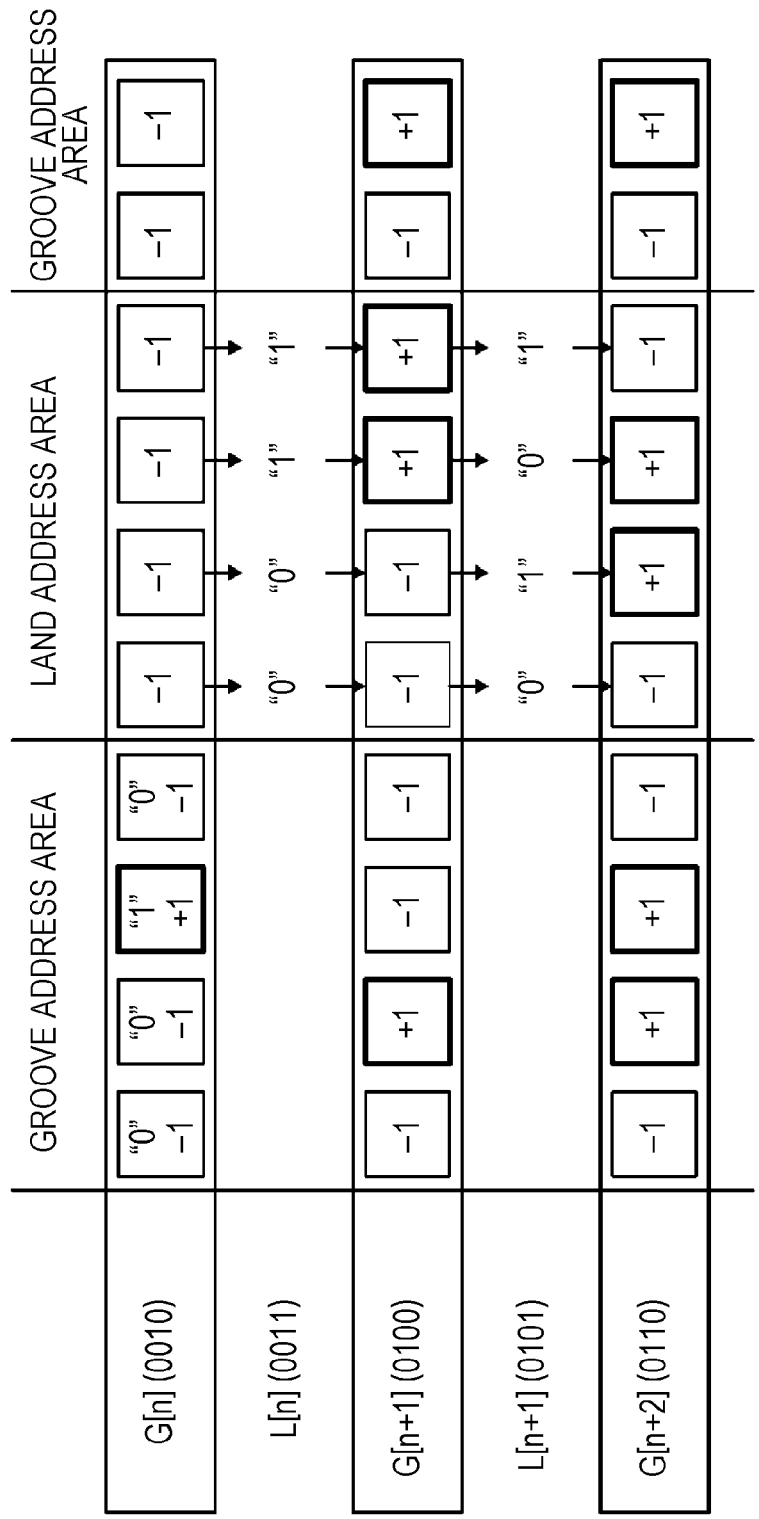
FIG. 13 is a schematic diagram illustrating one example of a recording method of address information.

FIG. 13 is a schematic diagram illustrating one example of a recording method of address information. The groove address information converted into binary information "−1" and "+1" is recorded in the groove address area in the groove G[n] as STWs.

When the groove address information is recording as STWs, it is converted into binary information, for example, as follows:

Groove address information "0"→Binary information "−1"

Groove address information "1"→Binary information "+1"

The land address information is recorded to the land address area in the land L[n] by a combination of the polarities of the STWs in the grooves G[n] and G[n+1] at two opposite sides of and adjacent to the land L[n]. For example, when land address information "0" is recorded to the land address area in the land L[n], STWs (data) having the same polarity are recorded to the grooves G[n] and G[n+1] that are adjacent to the land L[n]. When the land address information "1" is recorded to the land address area of the land L[n], STWs (data) having reverse polarities are recorded to the grooves G[n] and G[n+1] adjacent to the land L[n].

The relationship between the land address information and the polarities of the STW (data) recorded to the adjacent grooves is noted below:

Land address information "0"→Combination of STW polarities "−1 and −1" or "+1 and +1"

Land address information "1"→Combination of STW polarities "+1 and −1" or "−1 and +1"

(Playback Method of Address Information)

Figure 14:
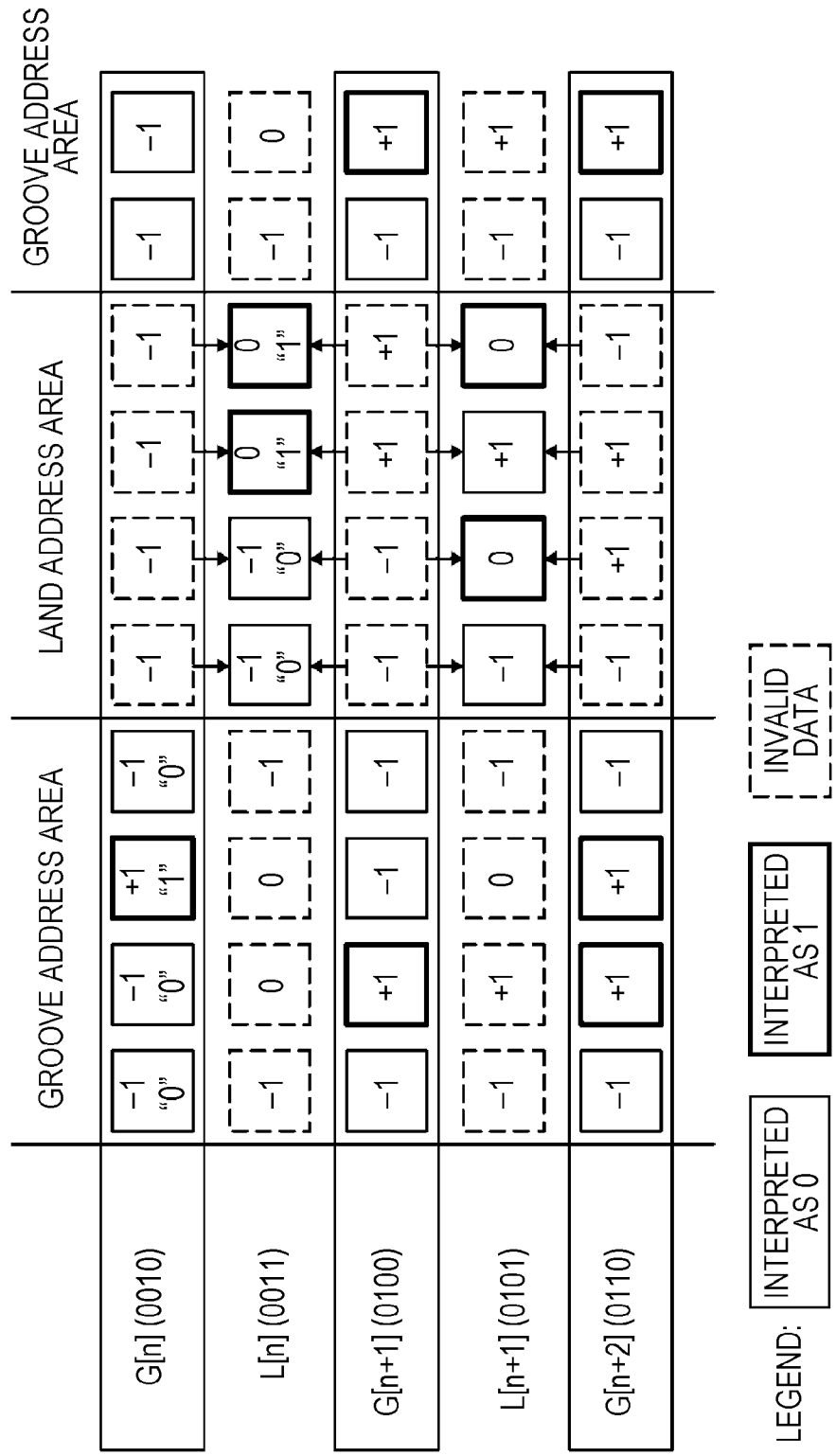
FIG. 14 is a schematic diagram illustrating one example of a playback method of address information.

FIG. 14 is a schematic diagram illustrating one example of a playback method of address information. During playback of the groove G[n], STW signals are read from both of the grooves G[n] in the groove address area and the land address area, so that binary information "−1" and "+1" is decoded.

The decoded binary information "−1" and "+1" is then converted into groove address information, as follows:

Binary information "−1"→Groove address information "0"

Binary information "+1"→Groove address information "1"

The groove address information read from the groove G[n] in the groove address area and converted is determined to be valid groove address information and is used as groove address information. On the other hand, the groove address information read from the groove G[n] in the land address area and converted is determined to be invalid groove address information and is handled as invalid data. Whether or not the groove address information is valid is determined, for example, by checking continuity with the read previous and subsequent groove address information.

During playback of the land L[n], three-value information "−1", "0", "+1" is read from both of the lands L[n] in the groove address area and the land address area. More specifically, when STW signals having the same polarity (i.e., data having the same polarity) are recorded in the grooves G[n] and G[n+1] at two opposite ends of and adjacent to the land L[n], data "−1" or "+1" of the three-value information is read. On the other hand, when STW signals having reverse polarities (i.e., data having reverse polarities) are recorded in the groove G[n] and G[n+1] at two opposite ends of and adjacent to the land L[n], "0" of the three-value information is read.

Three-value information "−1", "0", and "+1" read from the lands L[n] in the groove address area and the land address area is converted into land address information, for example, as described below:

Three-value information "−1"→Land address information "0"

Three-value information "+1"→Land address information "0"

Three-value information "0"→Land address information "1"

The land address information read from the groove L[n] in the land address area and converted is determined to be valid land address information and is used as land address information. On the other hand, the land address information read from the groove L[n] in the groove address area and converted is determined to be invalid land address information and is handled as invalid data. Whether or not the groove address information is valid is determined, for example, by checking continuity with the read previous and subsequent groove address information.

(Arrangement of Address Area)

Figure 15:
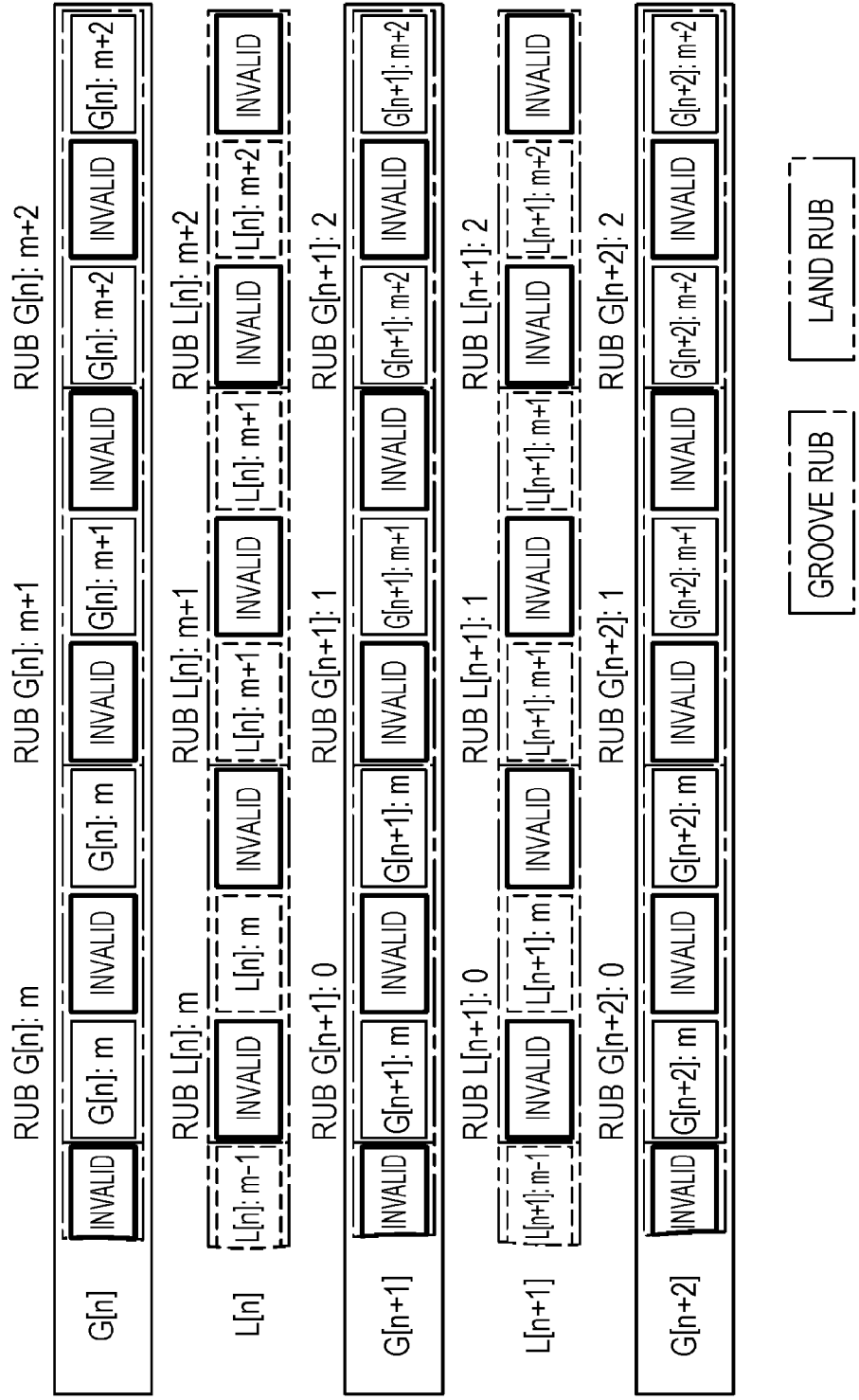
FIG. 15 is a schematic diagram illustrating one example of arrangement of groove address areas and land address areas.

FIG. 15 is a schematic diagram illustrating one example of arrangement of groove address areas and land address areas. Three ADIP words are assigned to each RUB. The number of ADIP words assigned to each RUB is not limited to this example and is also settable to a value other than 3.

A groove address area and a land address area included in the ADIP word are alternately provided in the circumferential direction of the optical-information recording medium 1. More specifically, in the circumferential direction of the optical-information recording medium 1, a valid groove address area and an invalid groove address area are alternately provided for each ADIP word and a valid land address area and an invalid land address area are alternately provided for each ADIP word. On the other hand, in the diameter direction of the optical-information recording medium 1, a valid groove address area and an invalid land address area are alternately provided and a valid land address area and an invalid groove address area are alternately provided. The arrangement of the address areas is not limited to this example. For example, in the circumferential direction of the optical-information recording medium 1, a valid groove address area and an invalid groove address area may be alternately provided for each RUB and a valid land address area and an invalid land address area may be alternately provided for each RUB. In this case, the valid groove address area and the valid land address area represent an area in which valid groove address information is recorded and an area in which valid land address information is recorded, respectively. On the other hand, the invalid groove address area and the invalid land address area represent an area in which invalid groove address information is recorded and an area in which invalid land address information is recorded, respectively.

[4. Configuration of Playback Apparatus]

Figure 16:
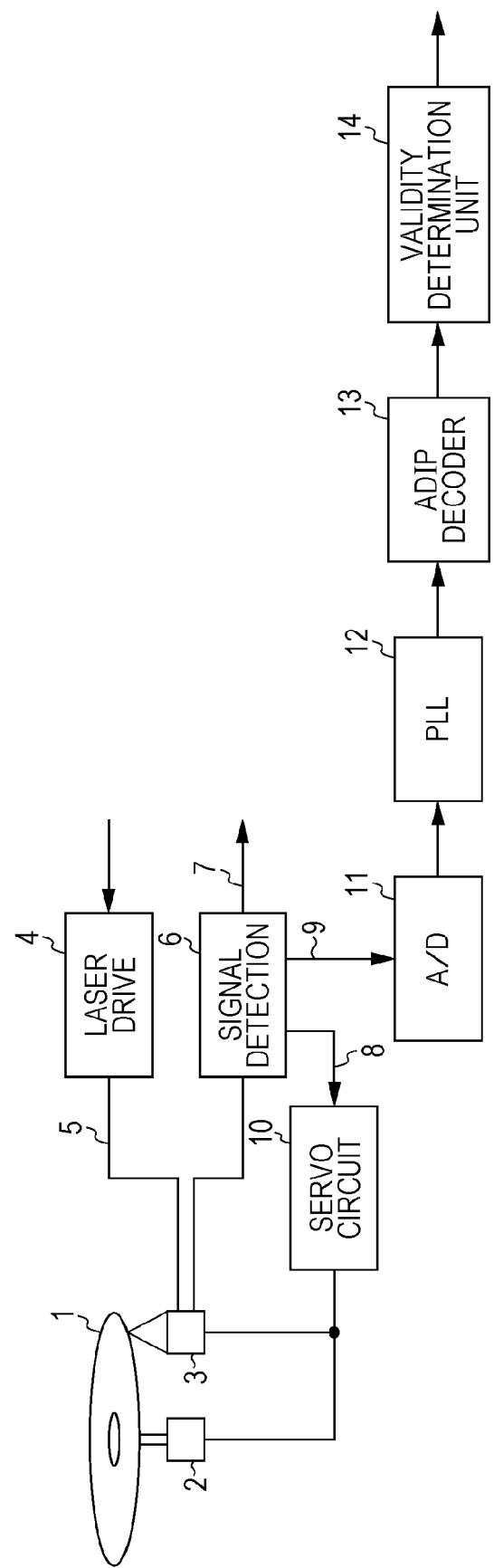
FIG. 16 is a block diagram illustrating one example of the configuration of a playback apparatus according to one embodiment of the present technology.

FIG. 16 is a block diagram illustrating one example of the configuration of a playback apparatus according to one embodiment of the present technology. Data is recorded to the optical-information recording medium 1 on which groove address information and land address information are recorded and data is played back from the optical-information recording medium 1.

The optical-information recording medium 1 is rotated by a spindle motor 2 at a constant angular velocity. That is, the optical-information recording medium 1 is rotated by a CAV system. A zone CAV system may also be used. A drive signal from a laser drive unit 4 is supplied to an optical head 3 and the optical-information recording medium 1 is irradiated with laser beam from the optical head 3, the laser beam having an intensity modulated in accordance with record data 5. Data is then recorded to a predetermined position on the optical-information recording medium 1, the predetermined position being determined on the basis of played back address information.

The optical-information recording medium 1 is irradiated with laser beam read from the optical head 3, reflection light of the laser light is detected by a photodetector in the optical head 3, and a playback signal is detected by a signal detection unit 6. A playback signal 7, a servo error signal 8, and a wobble signal 9 are output from the signal detection unit 6. Examples of the servo-error signal 8 include a focus-error signal and a tracking-error signal. The wobble signal 9 is a signal output from a detector having optical detection elements bisected in a track direction. For example, a sum signal of the two detectors is output as the wobble signal 9. The wobble signal 9 has a waveform corresponding to the wobble waveform. When the phases of the wobbles at two opposite sides of the track are the same, the level of the wobble signal 9 is maximized, and when the levels of the wobbles at two opposite sides of the track are reverse to each other, the level of the wobble signal 9 is minimized. The servo error signal 8 is supplied to a servo circuit 10. The servo circuit 10 controls the rotation of the spindle motor 2 to a certain angular velocity and controls the focusing and tracking of the optical head 3.

The wobble signal 9 detected by the signal detection unit 6 is supplied to an analog-to-digital (A/D) converter 11 and is converted into a digital signal by the A/D converter 11. A signal output from the A/D converter 11 is supplied to a digital phase-locked loop (PLL) 12 and clock extraction and MSK and STW pulse extraction are performed by the digital PLL12. The extracted digital signal, such as the MSK and STW pulses, are supplied to an ADIP decoder 13.

The ADIP decoder 13 uses the digital signal, supplied from the digital PLL12, to decode address information and so on recorded using MSK and STW for each ADIP word and performs error correction. The address information decoded by the ADIP decoder 13 is supplied to a validity determination unit 14. When the groove track is scanned, the groove address information is extracted as an output. When the land address is scanned, the land address information is extracted as an output.

Which of the groove and the land is scanned can be determined, for example, on the basis of a servo signal or the like. In a system in which a servo signal is not determinable, an output of a decoder that can correctly decode the address information may be regarded as an address.

The validity determination unit 14 determines the validity of the address information supplied from the ADIP decoder 13 and outputs only address information determined to be valid. For example, when the groove track is scanned, the validity determination unit 14 determines the validity of the groove address information supplied from the ADIP decoder 13 and outputs only the groove address information determined to be valid. The validity of the groove address information is determined, for example, on the basis of continuity with the previously and subsequently read groove address information. On the other hand, when the land track is scanned, the validity determination unit 14 determines the validity of the land address information supplied from the ADIP decoder 13 and outputs only the land address information determined to be valid. The validity of the land address information is determined, for example, on the basis of continuity with the previously and subsequently read land address information. A method for determining the validity of the groove address information and the land address information is not limited to the example described above. Examples of another method include a method for making the determination on the basis of whether or not the information can pass through an error correction circuit and a method for making the determination by changing the way of synchronization (Sync) between the land and the groove.

Figure 17:
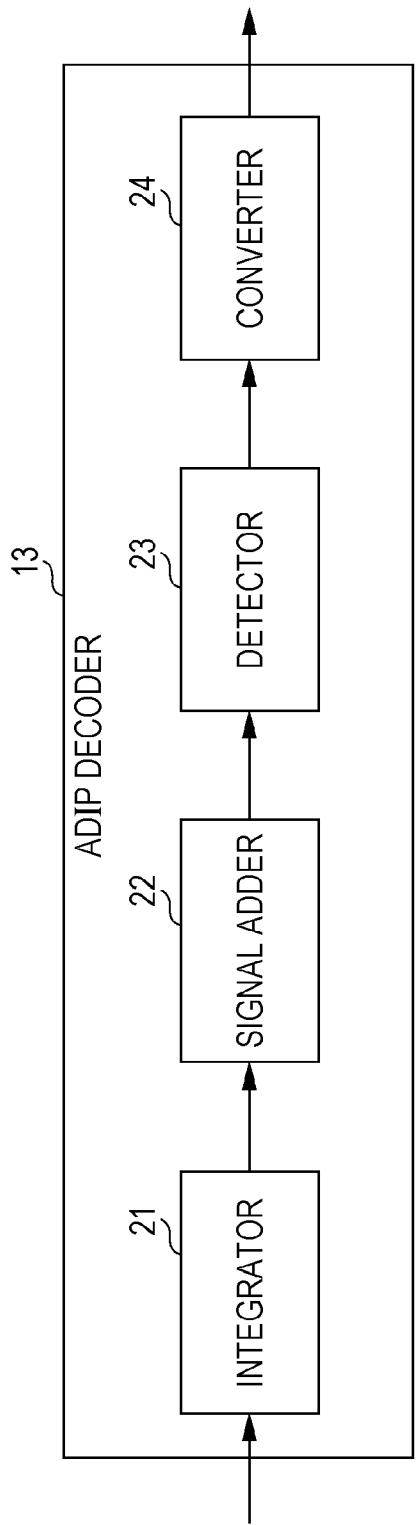
FIG. 17 is a block diagram illustrating one example of the configuration of an ADIP decoder.

FIG. 17 is a block diagram illustrating one example of the configuration of an ADIP decoder. The ADIP decoder 13 includes an integrator 21, a signal adder 22, a detector 23, and a converter 24. In this case, a description will be given of, of the ADIP decoder, only a portion related to decoding of address information recorded as STW signals.

The integrator 21 integrates the STW signals for a one-wobble period and supplies the integration result to the signal adder 22. More specifically, the integrator 21 performs processing for generating a waveform S3 from a waveform S1 of an STW signal and integrating the waveform S3 for a one-wobble period (see FIGS. 6A and 6B) or processing for generating a waveform S4 from a waveform S2 of an STW signal and integrating the waveform S4 for a one-wobble period (see FIGS. 7A and 7B). The integrator 21 then supplies the integration result to the signal adder 22. A specific method for generating the waveforms S3 and S4 from the respective waveforms S1 and S2 has been described above with reference to FIGS. 6A to 7B. The signal adder 22 adds the integration results (each corresponding to a one-wobble period), supplied from the integrator 21, for a predetermined number of wobbles (e.g., a 37-wobble period) and supplies the addition result to the detector 23.

During playback of the groove track, the detector 23 decodes the addition result, supplied from the signal adder 22, into binary information by comparing the addition result with one threshold. More specifically, the detector 23 compares an addition result $\Sigma Sn$, supplied from the signal adder 22, with a threshold $\alpha$ and decodes the addition result into binary information on the basis of the comparison result.

An example of decoding into binary information is noted below:

"Threshold α<Addition result ΣSn"→Binary information "+1"

"Addition result ΣSn≤Threshold α"→Binary information "−1"

During playback of the land track, the detector 23 compares the addition result, supplied from the signal adder 22, with two thresholds to decode the addition result into three-value information. More specifically, the detector 23 compares the addition result ΣSn, supplied from the signal adder 22, with two thresholds, that is, a first threshold β1 and a second threshold β2, and decodes the addition result into three-value information on the basis of the comparison result.

An example of decoding into three-value information is noted below:

"First threshold β1<Addition result ΣSn"→Three-value information "+1"

"Second threshold β2≤Addition result ΣSn≤First threshold β1"→Three-value information "0"

"Second threshold β2>Addition result ΣSn"→Three-value information "−1"

The thresholds α, β1, and β2 are set to values that are different from each other.

During playback of the groove track, the converter 24 converts the binary information "+1" or "−1", supplied from the detector 23, into groove address information "1" or "0". During playback of the land track, the converter 24 also converts the three-value information "+1", "0", or "−1" supplied from the detector 23, into land track address information "1" or "0".

An example of converting the binary information into groove address information during playback of a groove track is noted below:

Binary information "+1"→Groove address information "1"

Binary information "−1"→Groove address information "0"

An example of converting the three-value information into land address information during playback of a land track is noted below:

Three-value information "+1"→Land address information "0"

Three-value information "0"→Land address information "1"

Three-value information "−1"→Land address information "0"

[5. Operation of Playback Apparatus]

An operation of the playback apparatus according to a first embodiment of the present technology will be described below in conjunction with address decoding processing during playback of a groove track and address decoding processing during playback of a land track.

(Address Decoding Processing During Playback of Groove Track)

Figure 18:
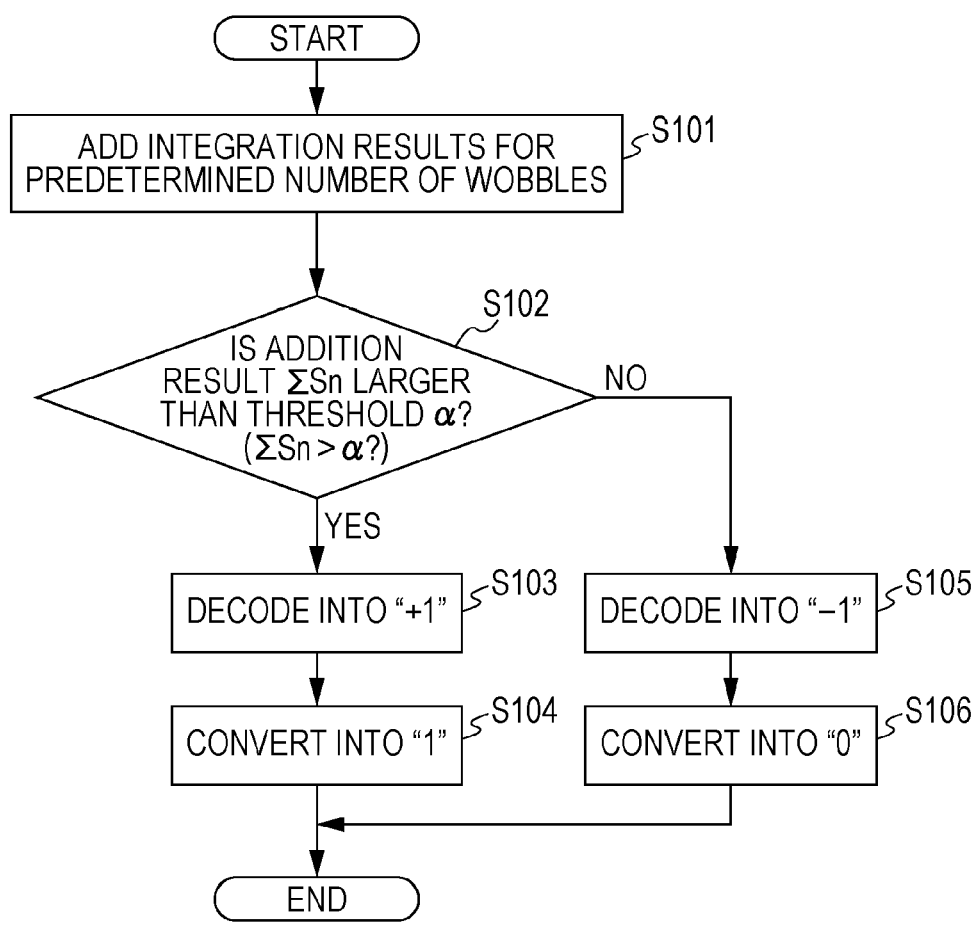
FIG. 18 is a flowchart illustrating one example of address decoding processing during playback of a groove track.

FIG. 18 is a flowchart illustrating one example of address decoding processing during playback of a groove track. First, in step S101, the signal adder 22 adds the integration results (each corresponding to a one-wobble period), supplied from the integrator 21, for a predetermined number of wobbles (e.g., a 37-wobble period) and supplies an addition result ΣSn to the detector 23.

Next, in step S102, the detector 23 determines whether or not the addition result ΣSn supplied from the signal adder 22 is larger than a threshold α. When it is determined in step S102 that the addition result ΣSn is larger than the threshold α, the process proceeds to step S103 in which the detector 23 decodes the addition result ΣSn into binary information "+1" and supplies the binary information "+1", which is a decoding result, to the converter 24. Next, in step S104, the converter 24 converts the binary information "+1", supplied from the detector 23, into groove address information "1". On the other hand, when it is determined in step S102 that the addition result ΣSn is smaller than or equal to the threshold α, the process proceeds to step S105 in which the detector 23 decodes the addition result ΣSn into binary information "−1" and supplies the binary information "−1", which is a decoding result, to the converter 24. Next, in step S106, the converter 24 converts the binary information "−1", supplied from the detector 23, into groove address information "0".

(Address Decoding Processing During Playback of Land Track)

Figure 19:
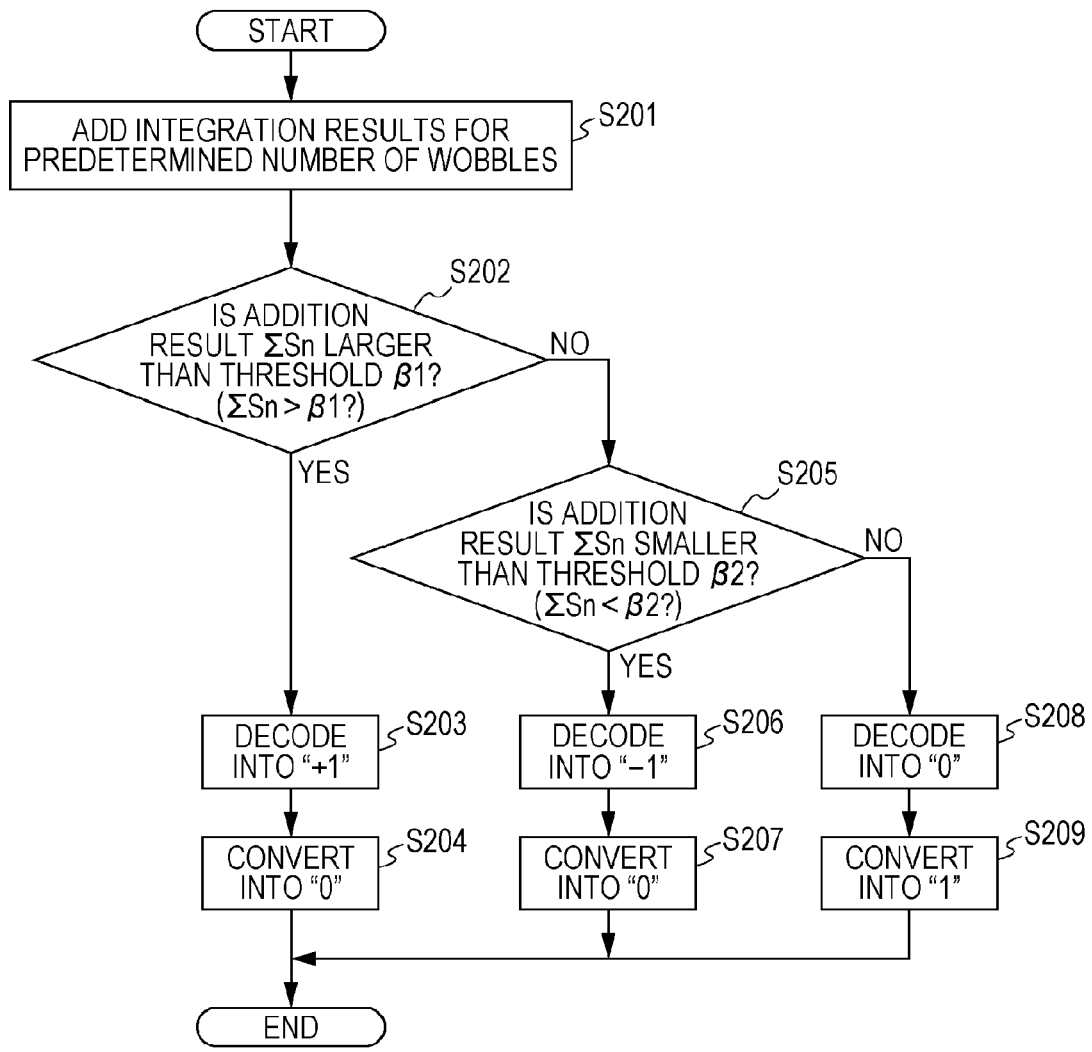
FIG. 19 is a flowchart illustrating one example of address decoding processing during playback of a land track.

FIG. 19 is a flowchart illustrating one example of address decoding processing during playback of a land track. First, in step S201, the signal adder 22 adds the integration results (each corresponding to a one-wobble period), supplied from the integrator 21, for a predetermined number of wobbles (e.g., a 37-wobble period) and supplies an addition result ΣSn to the detector 23.

Next, in step S202, the detector 23 determines whether or not the addition result ΣSn supplied from the signal adder 22 is larger than a first threshold β1. When it is determined in step S202 that the addition result ΣSn is larger than the first threshold β1, the process proceeds to step S203 in which the detector 23 decodes the addition result ΣSn into three-value information "+1" and supplies the three-value information "+1", which is a decoding result, to the converter 24. Next, in step S204, the converter 24 converts the three-value information "+1", supplied from the detector 23, into land address information "0".

When it is determined in step S202 that the addition result ΣSn is smaller than or equal to the first threshold β1, the process proceeds to step S205 in which the detector 23 determines whether or not the addition result ΣSn, supplied from the signal adder 22, is smaller than a second threshold β2.

When it is determined in step S205 that the addition result ΣSn is smaller than the second threshold β2, the process proceeds to step S206 in which the detector 23 decodes the addition result ΣSn into three-value information "−1" and supplies the three-value information "−1", which is a decoding result, to the converter 24. Next, in step S207, the converter 24 converts the three-value information "−1", supplied from the detector 23, into land address information "0".

When it is determined in step S205 that the addition result ΣSn is larger than or equal to the second threshold β2, the process proceeds to step S208 in which the detector 23 decodes the addition result ΣSn into three-value information "0" and supplies the three-value information "0", which is a decoding result, to the converter 24. Next, in step S209, the converter 24 converts the three-value information "0", supplied from the detector 23, into land address information "1".

(Advantages)

As described above, according to one embodiment of the present technology, the groove address information and the land address information can be recorded with STWs in the groove. Accordingly, during mastering, both of the groove address information and the land address information can be recorded by single-beam exposure. In addition, since the address information do not have to be recorded as preformat pits, a reduction in a data region for recording user data and so on can be suppressed and the address information can be efficiently recorded.

The land address information can be recorded by a combination of the polarities of the wobbles in the grooves provided at two opposite sides of and adjacent to the land address area. Accordingly, the land address information can be recorded by only groove modulation. This system is also less susceptible to local blemishes. In addition, it is possible to fabricate a master by using a single-beam mastering apparatus.

[6. Modifications]

Figure 20:
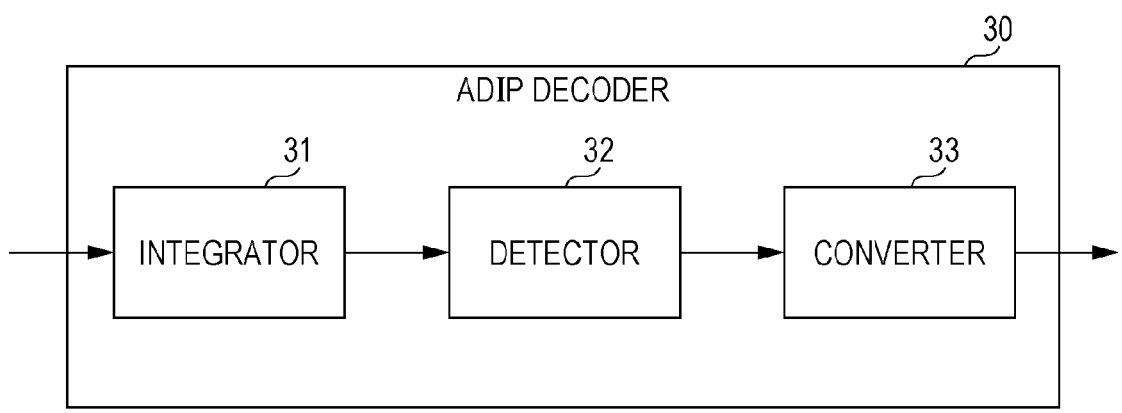
FIG. 20 is a block diagram illustrating a modification of the ADIP decoder.

FIG. 20 is a block diagram illustrating a modification of the ADIP decoder. An ADIP decoder 30 illustrated in FIG. 20 may also be used as an ADIP decoder instead of the ADIP decoder 13 illustrated in FIG. 17. As illustrated in FIG. 20, the ADIP decoder 30 includes an integrator 31, a detector 32, and a converter 33.

The integrator 31 sequentially integrates STW signals for a predetermined number of wobbles and supplies the integration result to the detector 32. For example, the integrator 31 continuously operates on 37 STW-modulated wobbles (see FIG. 3), from 18 to 54, and supplies the integration result to the detector 32.

During playback of a groove track, the detector 32 compares the integration result, supplied from the integrator 31, with one threshold to decode the integration result into binary information. More specifically, the detector 32 compares an integration value S, supplied from the integrator 31, with a threshold γ and decodes the integration value S into binary information on the basis of the comparison result.

An example of decoding into binary information is noted below:

"Threshold γ<Integration value S"→Binary information "+1"

"Integral S≤Threshold γ"→Binary information "−1"

During playback of a land track, the detector 32 compares the integration result, supplied from the integrator 31, with two thresholds to decode the integration result into three-value information. More specifically, the detector 32 compares the integration result S, supplied from the integrator 31, with two thresholds, that is, a first threshold α1 and a second threshold α2, and decodes the integration result S into three-value information on the basis of the comparison result.

An example of decoding into three-value information is noted below:

"First threshold α1<Addition result S"→Three-value information "+1"

"Second threshold α2≤Addition result S≤First threshold α1"→Three-value information "0"

"Second threshold α2>Addition result S"→Three-value information "−1"

The thresholds γ, α1, and α2 are set to values that are different from each other.

The converter 33 is similar to the converter 24 according to the first embodiment described above.

Although the embodiments of the present technology have been specifically described above, the present technology is not limited to the above-described embodiments and various changes and modifications based on the technical idea of the present technology can be made thereto.

For example, the configurations, methods, shapes, numeric values, and so on in the above-described embodiments are merely exemplary, and other configurations, methods, shapes, numeric values, and so on may also be used as appropriate.

The above-described embodiments, methods, shapes, numeric values, and so on may be combined together without departing from the spirit of the present technology.

The present technology may also have the following configuration:

(1) An optical-information recording medium including:
a groove and a land that are alternately provided,
wherein address information in the groove is recorded by wobbles in the groove, and
address information on the land is recorded by a combination of the wobbles in the grooves provided at two opposite sides of the land.

(2) The optical-information recording medium according to (1), wherein the combination of the wobbles is a combination of polarities of the wobbles.

(3) The optical-information recording medium according to (2), wherein the address information on the land is recorded as three-value information by the combination of the polarities of the wobbles.

(4) The optical-information recording medium according to (1), wherein the wobbles have a first wobble and a second wobble, and
the combination of the wobbles is a combination of the first wobble and the second wobble.

(5) The optical-information recording medium according to (4),
wherein the first wobble has a positive polarity, and
the second wobble has a negative polarity.

(6) The optical-information recording medium according to (4) or (5),
wherein the first wobble is tilted in a first direction relative to a reference wobble, and
the second wobble is tilted in a second direction relative to the reference wobble, the second direction being opposite to the first direction.

(7) The optical-information recording medium according to one of (1) to (6),
wherein the wobbles in the grooves provided at two opposite sides of the land have the same phase or substantially the same phase.

(8) The optical-information recording medium according to one of (1) to (7),
wherein the groove has a first region in which the address information in the groove is recorded and a second region in which the address information in the groove is not recorded;
the land has a first region in which the address information on the land is recorded and a second region in which the address information on the land is not recorded; and
the first region of the groove and the second region of the land are provided adjacent to each other and the second region of groove and the first region of the land are provided adjacent to each other.

(9) A playback apparatus including:
an optical unit configured to obtain reflection light by irradiating a land or a groove of an optical-information recording medium with light;
an address-signal generator configured to generate an address signal recorded by a combination of wobbles in the grooves provided at two opposite sides of the land, on the basis of the reflection light obtained by the optical unit; and
an address-information obtainer configured to obtain land address information from the address signal generated by the address-signal generator.

(10) The playback apparatus according to (9), wherein the address-information obtainer compares the address signal with two thresholds to generate three-value information and converts the generated three-value information into land address information.

The present disclosure contains subject matter related to that disclosed in Japanese Priority Patent Application JP 2012-136202 filed in the Japan Patent Office on Jun. 15, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical-information recording medium comprising:
    a groove and a land that are alternately provided,
    wherein address information in the groove is recorded by first and second wobbles in the groove, the first wobble is tilted in a first direction relative to a reference wobble, and the second wobble is tilted in a second direction, opposite the first direction, relative to the reference wobble, and
    address information on the land is recorded by a combination of the wobbles in the grooves provided at two opposite sides of the land.

2. The optical-information recording medium according to claim 1, wherein the combination of the wobbles is a combination of polarities of the wobbles.

3. The optical-information recording medium according to claim 2, wherein the address information on the land is recorded as three-value information by the combination of the polarities of the wobbles.

4. The optical-information recording medium according to claim 1,
    wherein the first wobble has a positive polarity, and
    the second wobble has a negative polarity.

5. The optical-information recording medium according to claim 1,
    wherein the wobbles in the grooves provided at two opposite sides of the land have the same phase or substantially the same phase.

6. The optical-information recording medium according to claim 1,
    wherein the groove has a first region in which the address information in the groove is recorded and a second region in which the address information in the groove is not recorded;
    the land has a first region in which the address information on the land is recorded and a second region in which the address information on the land is not recorded; and
    the first region of the groove and the second region of the land are provided adjacent to each other and the second region of groove and the first region of the land are provided adjacent to each other.

7. A playback apparatus comprising:
    an optical unit configured to obtain reflection light by irradiating a land or a groove of an optical-information recording medium with light;
    an address-signal generator configured to generate an address signal recorded by a combination of first and second wobbles in the grooves provided at two opposite sides of the land and tilted in opposite directions, on the basis of the reflection light obtained by the optical unit; and
    an address-information obtainer configured to obtain land address information from the address signal generated by the address-signal generator.

8. The playback apparatus according to claim 7, wherein the address-information obtainer compares the address signal with two thresholds to generate three-value information and converts the generated three-value information into land address information.

* * * * *